(12) United States Patent
Miura et al.

(10) Patent No.: US 9,709,293 B2
(45) Date of Patent: Jul. 18, 2017

(54) CONTROLLING DEVICE AND CONTROLLING METHOD

(71) Applicant: Azbil Corporation, Tokyo (JP)

(72) Inventors: Mayumi Miura, Tokyo (JP); Masato Tanaka, Tokyo (JP)

(73) Assignee: Azbil Corporation, Tokyo (JP)

( * ) Notice: Subject to any disclaimer, the term of this patent is extended or adjusted under 35 U.S.C. 154(b) by 372 days.

(21) Appl. No.: 14/290,191

(22) Filed: May 29, 2014

(65) Prior Publication Data

US 2014/0358299 A1    Dec. 4, 2014

(30) Foreign Application Priority Data

May 29, 2013 (JP) ................................ 2013-112673

(51) Int. Cl.
| | |
|---|---|
| F24F 11/00 | (2006.01) |
| G05B 11/42 | (2006.01) |
| G05B 13/04 | (2006.01) |
| G05B 13/02 | (2006.01) |
| G05D 23/19 | (2006.01) |

(52) U.S. Cl.
CPC ........ *F24F 11/006* (2013.01); *F24F 11/0009* (2013.01); *F24F 11/0012* (2013.01); *G05B 11/42* (2013.01); *G05B 13/024* (2013.01); *G05B 13/04* (2013.01); *G05B 13/042* (2013.01); *G05D 23/1919* (2013.01)

(58) Field of Classification Search
CPC ........ G05B 5/01; G05B 11/42; G05B 13/024; G05B 13/042; G05B 17/02; F24F 11/053; G05D 23/1934; G06G 7/66
See application file for complete search history.

(56) References Cited

U.S. PATENT DOCUMENTS

| | | | | |
|---|---|---|---|---|
| 3,798,426 A | * | 3/1974 | Bristol, II | ................ G06G 7/66 700/38 |
| 5,170,341 A | * | 12/1992 | Sklaroff | ............... G05B 13/024 700/42 |
| 5,867,384 A | * | 2/1999 | Drees | ........................ G05B 5/01 700/42 |

(Continued)

FOREIGN PATENT DOCUMENTS

| | | |
|---|---|---|
| CN | 102466303 A | 5/2012 |
| JP | S60-201116 A | 10/1985 |

(Continued)

OTHER PUBLICATIONS

Chinese Office Action dated May 16, 2016, issued in corresponding Application No 201410228732.6.
Kana Mizutani, et al. "Development of a Variable Air Conditioning Controlling Technology Based on Occupant Satisfaction Levels (Report 3): Occupant Satisfaction Levels and Energy Consumption in a Varying Room Temperature Environment", 2012, Air Conditioning/Hygiene Engineering Conference Compendium.

(Continued)

*Primary Examiner* — Crystal J Barnes-Bullock
(74) *Attorney, Agent, or Firm* — Troutman Sanders LLP

(57) ABSTRACT

The controlling device includes a set point obtaining portion that obtains a set point from a feedback controlling system for calculating, and outputting to an actuator, a manipulated variable based on the set point and a process variable, and an actuator controlling portion that changes a gain of an actuator so as to have an effect of a change in the process variable that is produced through the change in the gain of the actuator tracking a change in the set point.

16 Claims, 18 Drawing Sheets

(56) References Cited

U.S. PATENT DOCUMENTS

| | | | | |
|---|---|---|---|---|
| 6,688,532 | B2* | 2/2004 | Nanno | G05B 17/02 |
| | | | | 236/78 D |
| 6,892,101 | B2* | 5/2005 | Tanaka | G05B 5/01 |
| | | | | 318/561 |
| 8,126,575 | B2* | 2/2012 | Attarwala | G05B 13/048 |
| | | | | 700/19 |
| 8,756,039 | B2* | 6/2014 | Coughran | G05B 17/02 |
| | | | | 703/2 |
| 9,110,453 | B2* | 8/2015 | Cheng | G05B 13/027 |
| 2012/0118986 | A1* | 5/2012 | Dazai | F24F 3/0442 |
| | | | | 236/49.3 |

FOREIGN PATENT DOCUMENTS

| | | | |
|---|---|---|---|
| JP | H07-332728 | A | 12/1995 |
| JP | H11211191 | A | 8/1999 |
| JP | 2001-036770 | A | 2/2001 |
| JP | 2002-149207 | A | 5/2002 |
| JP | 2003-167605 | A | 6/2003 |
| JP | 4358674 | | 11/2009 |
| JP | 2011-100203 | A | 5/2011 |
| JP | 2012190344 | A | 10/2012 |
| JP | 2013-2748 | | 1/2013 |

OTHER PUBLICATIONS

Japanese Office Action mailed Feb. 7, 2017, issued in corresponding Japanese Patent Application No. 2013-112673.

* cited by examiner

CONTROLLING DEVICE AND CONTROLLING METHOD

CROSS REFERENCE TO RELATED APPLICATION

This application claims priority under 35 U.S.C. §119 to Japanese Patent Application No. 2013-112673, filed on May 29, 2013, the entire content of which being hereby incorporated herein by reference.

FIELD OF TECHNOLOGY

The present disclosure relates to a process controlling technology, and, in particular, relates to a controlling device and controlling method able to increase the responsiveness of control when deliberately varying a process variable for the purpose of energy conservation control, occupant comfort control, or both (hereinafter termed simply "energy conservation control and comfort control").

BACKGROUND

In process control for temperature, pressure, or the like, generally PID control, which is a linear control logic, is used. See, for example, Japanese Patent No. 4358674. Insofar as the control characteristics are nearly linear characteristics, this is applied to control of process gain as well.

Examples of control technologies that use PID include technologies that increase the probability of achieving stabilized control for achieving energy conservation in a range that, for example, does not lead to excessive compromising of the living environment in the case of air conditioning control. See, for example, Japanese Unexamined Patent Application Publication 2013-2748 ("the JP 748"). Moreover, there are technologies that attempt to achieve energy conservation while preventing reductions in intellectual productivity. See, for example, Kana MIZUTANI, et al., "Development of a Variable Air Conditioning Controlling Technology Based on Occupant Satisfaction Levels (Report 3): Occupant Satisfaction Levels and Energy Consumption in a Varying Room Temperature Environment", Air Conditioning/Hygiene Engineering Conference Compendium, September 2012 ("Mizutani"). In such technologies, the set points in PID control are assertively in moved up and down, and the process variables are caused to track thereto, so as to achieve the objective. Consequently, it is necessary to secure suitable responsiveness.

In linear control logic PID control, when the responsiveness of the feedback control system is increased in order to not lose the linearity of the process gain, there is a limit to the improvement in responsiveness. For example, in the technology disclosed in the JP 748, a phenomenon occurred wherein it was difficult to change the room temperature despite changing the room temperature set point. Moreover, when the control parameters are set so as to overemphasize the control responsiveness, there is the possibility that the stability of control will be lost, resulting in unstable control characteristics.

The present invention is to solve the problems set forth above, and an aspect thereof is to provide a controlling device and controlling method able to increase the responsiveness of feedback control when deliberately varying a process variable for the purpose of energy conservation control, occupant comfort control, or both, without changing a control parameter.

SUMMARY

A controlling device according to the present invention includes: a set point obtaining portion that obtains a set point SP from a feedback control system that calculates, and outputs to an actuator, a manipulated variable MV based on the set point SP, which indicates a target condition for a control object, and on a process variable PV that is a measured value for the state of the control object; and an actuator controlling portion that changes a gain of the actuator so as to have an effect wherein a change of the process variable PV that is produced through a change in the gain of the actuator tracks a change in the set point SP.

The controlling device as set forth in the first structural example according to the present invention, wherein: the feedback controlling system is a control loop that controls a room temperature through flow rate control of a thermal medium; and the actuator controlling portion changes the gain of the actuator through controlling the temperature of the thermal medium in accordance with a change in the set point SP that indicates the target value for the room temperature.

The controlling device as set forth in the first structural example according to the present invention wherein: the feedback controlling system is a control loop that controls a room temperature through flow rate control of supply air, which is a thermal medium; the actuator is a VAV unit that adjusts the flow rate of the supply air; and the actuator controlling portion changes the gain of the actuator through controlling the temperature of the supply air in accordance with a change in the set point SP that indicates the target value for the room temperature.

The controlling device as set forth in the first structural example according to the present invention, wherein: the actuator controlling portion changes the gain of the actuator through ramping in accordance with a ramped change in the set point SP.

The controlling device as set forth in a first structural example according to the present invention, wherein: the actuator controlling portion changes the gain of the actuator through stepping in accordance with a stepped change in the set point SP.

The controlling device as set forth in the first structural example according to the present invention, wherein: the actuator controlling portion, after changing the gain of the actuator in accordance with a change in the set point SP, changes the gain of the actuator in accordance with time that has elapsed since the point in time of the change of the set point SP, so as to return to the value of the gain from prior to the change.

The controlling device as set forth in the first structural example according to the present invention, wherein: the actuator controlling portion, when the control pattern of the set point SP is applied in advance, change the gain of the actuator a certain amount of time prior to the change in the set point SP, depending on a signal that provides notification in advance of a change in the set point SP.

The controlling device as set forth in the first structural example according to the present invention, wherein: the actuator controlling portion causes the gain of the actuator to remain constant in the vicinity of a transition point of the set point SP from rising to falling or from falling to rising.

The controlling device as set forth in the first structural example according to the present invention, wherein: the actuator controlling portion changes the gain of the actuator in accordance with a magnitude of change or rate of change of the set point SP.

Moreover, a controlling method according to the present invention includes: a set point obtaining step for obtaining a set point SP from a feedback control system that calculates, and outputs to an actuator, a manipulated variable MV based on the set point SP, which indicates a target condition for a control object, and on a process variable PV that is a measured value for the state of the control object; and an actuator controlling step for changing a gain of the actuator so as to have an effect wherein a change of the process variable PV that is produced through a change in the gain of the actuator tracks a change in the set point SP.

The present invention makes it possible to achieve the ease of changing the process variable PV through changing the gain of the actuator so as to have the effect of the change in the process variable PV that is produced through the change in gain of the actuator linked to the change in the set point SP when there has been a change in the set point SP, making it possible to increase the responsiveness of the feedback control without changing the control parameters of the feedback control system.

Moreover, in the present disclosure, the gain of the actuator is changed through controlling the temperature of a thermal medium depending on a change in the set point SP.

Moreover, in the present disclosure, after the gain of the actuator has been changed in accordance with a change in the set point SP, the gain of the actuator is changed in accordance with the elapsed time from the point in time at which the set point SP was changed, in order to return to the value for the gain from prior to the change, enabling both an improvement in the responsiveness of the feedback control and an improvement in the convergence of the feedback control as well.

Additionally, in the present disclosure, it is possible to both improve the responsiveness of feedback control and improve the convergence of feedback control through changing the gain of the actuator a specific amount of time prior to a change in the set point SP, in response to a signal that provides advance notification of the change in the set point SP.

Moreover, in the present disclosure it is possible to both improve the responsiveness of feedback control and to prevent overshoot of the process variable PV, to improve the convergence to the set point SP of the process variable PV, through holding the gain of the actuator constant in the vicinity of the point of change in the set point SP from rising to falling or from falling to rising.

BRIEF DESCRIPTIONS OF THE DRAWINGS

DETAILED DESCRIPTION

Figure 1:
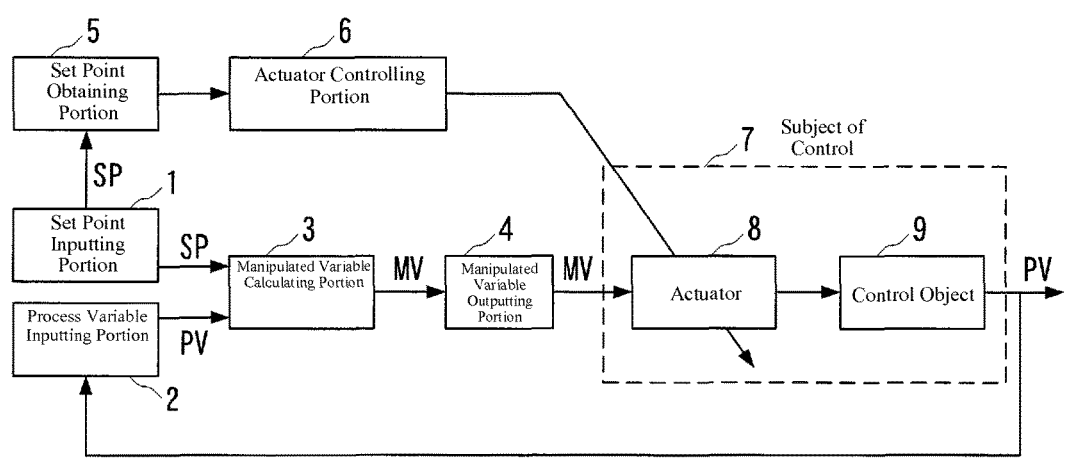
FIG. 1 is a block diagram illustrating a structure of a controlling device according to Example according to the present disclosure.

The process gain Kp that is subject to control, from the perspective of the controlling/calculating block in, for example, PID control can be divided into the gain Ka on the actuator side and the gain Km on the side of the object that is subject to control. While from the perspective of controlling and calculating, the process gain variation is no more than noise, the inventors have focused on the fact that, when intentionally varying the process variable PV, if the controllable actuator gain Ka is varied so as to apply noise to the correct side, then essentially this is equivalent to increasing the responsiveness to a change in the set point SP in the control system.

Additionally, they also arrived at the concept of actuator gain-linked control wherein when, for example, the room temperature control is through the supply air flow rate of the air conditioner (control wherein the supply air flow rate is the manipulated variable MV of the feedback system), the supply air temperature is varied upward or varied downward when the room temperature PV is intentionally varied upward or varied downward. That is, the actuator gain-linked control corresponds to intentionally linking the gain Ka of the flow rate adjusting damper, which is the actuator, to a change in the room temperature set point SP.

Moreover, the present inventors discovered that, for example, when control for changing intentionally the room temperature PV, for the purposes of, for example, energy conservation control or comfort control (hereinafter termed "room temperature variation control") is applied to air conditioning in a building, the change in the adventitious/disadvantageous stability direction of control is one factor in the controllability of air conditioning.

In a typical office building, or the like, the internal temperature environment in the building that is occupied by people changes gradually in units of days, weeks, months, or the like, depending on the weather, orientation, use of the building, or the like, where the air conditioning control parameters (hereinafter termed the PID parameters) are determined emphasizing stability of control over immediacy of control. When performing room temperature variation control in such a building, it is difficult to track room temperature variations with periods of several tens of minutes with the control parameters set emphasizing stability. That is, control parameter settings that emphasize stability are disadvantageous. However, readjusting the control parameters from control parameters that emphasize stability to control parameters that emphasize immediacy increases the adjustment costs in the operating environment.

On the other hand, in the room temperature variation control such as disclosed in Mizutani, despite this control reducing the likelihood of transient negative effects on the room environment, there are also cases wherein the operation will emphasize the achievement of energy conservation, and thus often these operations are limited to time bands or time periods wherein one wishes to control the energy consumption in particular, such as in the summer and in the winter. When returning to the constant room temperature control wherein cooling is always to 26° C. and heating is always to 22° C., control parameters that emphasize stability are more advantageous than control parameters that emphasize immediacy. The inventors focused on the disadvantageous/advantageous emphases on stability in control changing within the same control loop in this way as one factor that is an issue in controllability of air conditioning.

On the other hand, the inventors focused on the fact that, when performing the aforementioned actuator gain-linked control there will be variation in the process gain from the perspective of the controlling/calculating block, and thus preferably the actuator gain Ka is varied in a range of robust stability.

Moreover, the present ventures conceived of the idea that the need for readjusting the control parameters is reduced by achieving actuator gain-linked control by changing the temperature of the thermal medium linked to a change in the room temperature, making it possible to achieve both constant room temperature control and variable room temperature control without adjustment overhead. That is, in variable control with air conditioning that is intentionally set to robustly stable PID control (control that emphasizes stability), produces a correct combination with desirable actuator gain-linked control wherein the robustly stable range is ensured.

Example

Forms for carrying out the present disclosure will be explained below in reference to the figures. In the present example, the responsiveness of the feedback control system in the process control is improved through changing the actuator gain in response to a change in the set point SP so as to have the effect of the change (noise) in the process variable PV that is produced through a change in the actuator gain tracking the change in the set point SP. Note that in all of the examples set forth below, the explanation will be for cases wherein the pattern of linkage between the set point SP and the actuator gain is always with the opposite effect from the applicable feedback control system (that is, when the process variable PV is to be increased, the manipulated variable MV is decreased).

FIG. 1 is a block diagram illustrating one configuration of a controlling device according to the present example. The controlling device according to the present example includes: a set point inputting portion 1 for inputting a set point SP that indicates the target state of the control subject 7 that is structured from the actuator 8 and the control object 9; a process variable inputting portion 2 for inputting a process variable PV that is a state measurement value for the control subject 7; a manipulated variable calculating portion 3 for calculating a manipulated variable MV using a specific control calculating algorithm based on the set point SP and the process variable PV; a manipulated variable outputting portion 4 for outputting, to the actuator 8, the manipulated variable MV that is calculated by the manipulated variable calculating portion 3; a set point obtaining portion 5 for obtaining the set point SP that has been inputted into the set point inputting portion 1; and an actuator controlling portion 6 for changing the gain of the actuator 8 so that the change (noise) in the process variable PV produced by the change in the gain of the actuator 8 will have the effect of tracking the change in the set point SP when the set point SP has been changed.

The set point inputting portion 1, the process variable inputting portion 2, the manipulated variable calculating portion 3, the manipulated variable outputting portion 4, and the control object 7 structure the process control feedback (FB) control system. On the other hand, the set point obtaining portion 5 and the actuator controlling portion 6 structure the actuator gain (AG) controlling system.

The process gain Kp for the control subject 7 when viewed from the manipulated variable calculating portion 3 (the controlling/calculating block for, for example, PID control) can be divided into the gain Kag of the actuator 8 and the gain Km of the control object 9, and can be written as in the following equation:

$$Kp = Kag \times Km \quad (1)$$

The variation in the process gain Kp, when viewed from control calculations, is no more than noise, but when the process variable PV is varied intentionally for the purpose of, for example, energy conservation control and comfort control, if a controllable actuator gain Kag is varied so as to apply the noise in the direction that is beneficial to the feedback control system, then essentially this is identical to improving the set point SP variation responsiveness characteristics of the feedback control system. As shown below in Another Example as well, there are various patterns for linking of the actuator gain Kag to the set point SP of the feedback control system, but in the present example, the explanation will be for the case of a pattern wherein the actuator gain Kag is changed simultaneously with a change in the set point SP.

With arbitrary control periods, the set point SP is changed, and when the manipulated variable MV is changed to MV+ΔMV, the amount of change Δ PV in the process variable PV is given by the following formula:

$$\Delta PV = (Kag \times Km) \times \Delta MV \qquad (2)$$

Moreover, when, with the timing with which the set point SP is changed, the ΔKag change is made, in the direction that benefits the feedback control system, then, after the change, the actuator gain Kag' will be as given in Equation (3):

$$Kag' = (Kag + \Delta Kag) \qquad (3)$$

As a result, when compared to the actuator gain Kag that does not change, as in the conventional technology, the amount of change ΔPVag for the process variable PV when the actuator gain Kag is changed as shown in Equation (3) will be as in the following equations:

$$\begin{aligned}\Delta PVag &= (Kag' \times Km) \times \Delta MV \\&= ((Kag + \Delta Kag) \times Km) \times \Delta MV \\&= (Kag \times Km) \times \Delta MV + (\Delta Kag \times Km) \times \Delta MV \\&= \Delta PV + (\Delta Kag \times Km) \times \Delta MV'\end{aligned} \qquad (4)$$

Consequently, it is understood that if the actuator gain Kag is changed as in Equation (3), then the process variable PV will assume a value that is (ΔKag×Km)×ΔMV toward the side that benefits the feedback control system. However, because, from the perspective of the manipulated variable calculating portion 3, this will be the occurrence of process gain variation, preferably the actuator gain Kag' after the change is in a range wherein there is robust stability.

Note that the post-change actuator gain Kag' may instead be calculated through multiplying the pre-change actuator gain Kag by a variable multiplier α (where A is a real number that is greater than 0):

$$Kag' = \alpha \times Kag \qquad (5)$$

Figure 2:
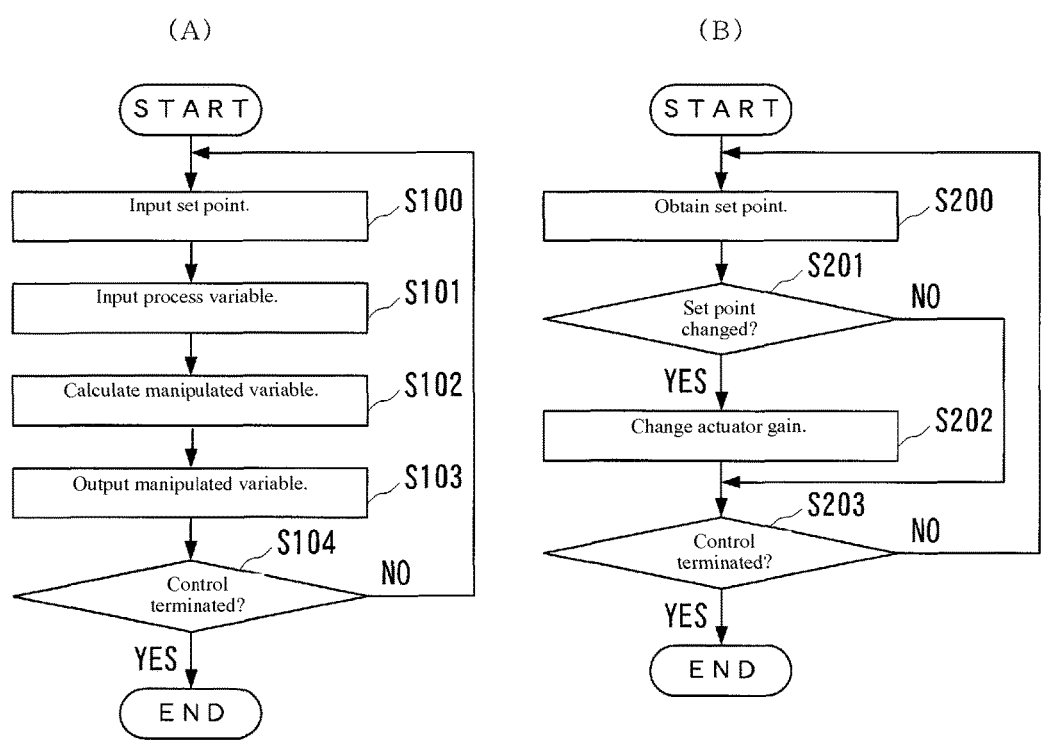
FIG. 2 is a flowchart illustrating the operation of the controlling device according to the Example according to the present disclosure.

FIG. 2 (A) and FIG. 2 (B) are flowcharts illustrating the operation of controlling devices according to the present example, where FIG. 2 (A) is a flowchart illustrating the operation of a feedback control system, and FIG. 2 (B) is a flowchart illustrating the operation of the actuator gain control system.

The operation of the feedback control system will be explained first. The set point SP is inputted into the manipulated variable calculating portion 3 through the set point inputting portion 1 (Step S100 in FIG. 2 (A)). The set point SP is, for example, set in advance to a reference set point that is a control set point for constant room temperature control, and is changed intentionally from the reference set point for, for example, the purpose of energy conservation control or comfort control. This type of change to the set point SP is disclosed in, for example, the JP 748.

The process variable PV is measured by a sensor, or the like, and is inputted into the manipulated variable calculating portion 3 through the process variable inputting portion 2 (Step S101 in FIG. 2 (A)).

The manipulated variable calculating portion 3 calculates a manipulated variable MV through performing a PID control calculation, such as in the transmission function equation, below, based on the set point SP and the process variable PV (Step S102 in FIG. 2 (A)).

$$MV = (100/PB) \times \{1 + (1/TIs) + TDs\} \times (SP - PV) \qquad (6)$$

In Equation (6), the PB, TI, and TD are PID parameters, where PB is the proportional zone, Ti is the integration time, and TD is the differentiation time. s is the Laplace operator.

The manipulated variable outputting portion 4 outputs, to the actuator 8, the manipulated variable MV that is calculated by the manipulated variable calculating portion 3 (Step S103 in FIG. 2 (A)).

The processes in Step S100 through S103, as described above, are repeated iteratively, with each control period, until, for example, termination of control through an instruction from an operator (YES in Step S104 in FIG. 2 (A)).

The operation for the actuator gain control system will be explained next. The set point obtaining portion 5 obtains the set point SP that has been inputted into the set point inputting portion 1 (Step S200 in FIG. 2 (B)).

When there has been a change of the set point SP that is obtained by the set point obtaining portion 5 relative to the immediately previous set point SP (the reference set point) (YES in Step S201 in FIG. 2 (B)), then the actuator controlling portion 6 changes the actuator gain Kag in accordance with the magnitude of the change relative to the immediately previous set point SP (Step S202 in FIG. 2 (B)). The change in the actuator gain Kag can be achieved through changing the variable multiplier α in Equation (5), for example, in accordance with the magnitude of change in the set point SP. At this time, the actuator controlling portion 6 determines the variable multiplier α so as to cause the actuator gain Kag to change more greatly the larger the magnitude of change in the set point SP.

The processes in Step S200 through S202 as described above are repeated at regular intervals until the control is terminated through, for example, an instruction from an operator (YES in Step S203 in FIG. 2 (B)). Note that the period of the actuator gain control system may or may not be the same as the period for the feedback control system.

Figure 3:
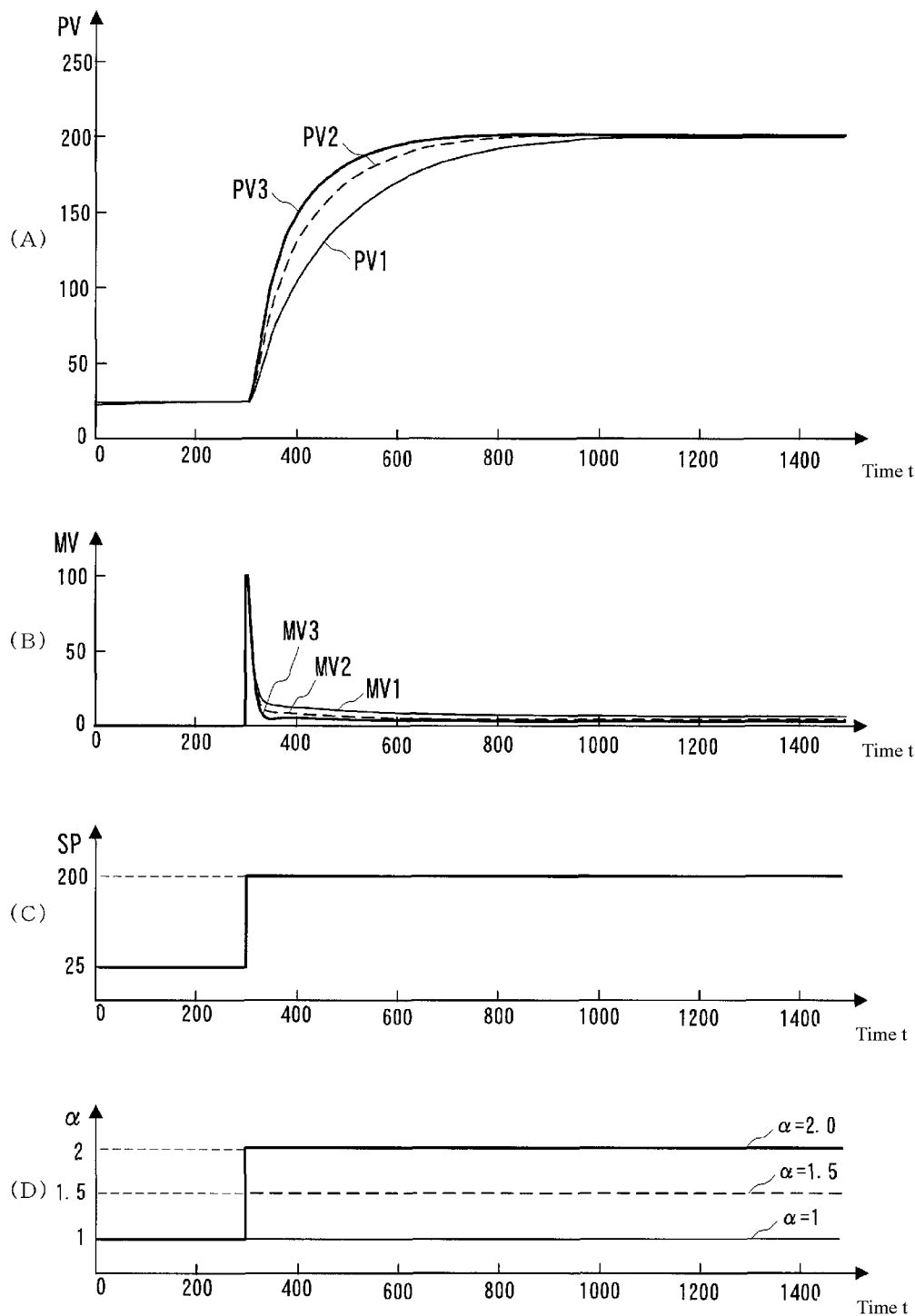
FIG. 3 is a diagram illustrating an example of operation of a controlling device according to the Example according to the present disclosure.

FIG. 3 (A) through FIG. 3 (D) show the results of simulations that show the effects of the present example. FIG. 3 (A) shows a change in the process variable PV when, at time t=300, the set point SP=25 was changed to SP=300, FIG. 3 (B) shows the change in the manipulated variable MV at the time of this set point change, FIG. 3 (C) shows the change in the set point SP, and FIG. 3 (D) shows the change in the variable multiplier α. In the feedback control system, the control parameters (PID parameters) are adjusted to emphasize stability of control.

The PV1 in FIG. 3 (A) is the process variable PV for the case wherein the actuator gain Kag does not change, as in the conventional technology, where PV2 is the process variable PV for the case wherein the variable multiplier α is changed to 1.5 by the actuator-linked control in the present example, at time t=300, and PV3 is the process variable PV in the case wherein the variable multiplier α is changed to 2 at time t=300. MV1 in FIG. 3 (B) is the manipulated variable MV in the case wherein the actuator gain Kag is not changed, where MV2 is the manipulated variable MV for the case wherein the variable multiplier α is changed to 1.5 by the actuator-linked control in the present example, at time t=300, and MV3 is the manipulated variable MV in the case wherein the variable multiplier α is changed to 2 at time t=300.

It can be understood from FIG. 3 (A) through FIG. 3 (D) that, when compared to a case wherein the actuator gain Kag does not change, such as is conventional (where the variable multiplier α is always 1), in a case wherein actuator gain linked-control according to the present example is performed (where the variable multiplier α is changed to 1.5 or 2 at t=300), the actuator gain Kag changes so as to apply noise that is beneficial to tracking to the set point SP of the process variable PV, to improve the responsiveness of the process variable PV. That is, it is understood that the process variables PV2 and PV3, when compared to the process variable PV1, produce changes (noise) that track to changes in the set point SP, increasing the responsiveness relative to the set point SP.

Figure 4:
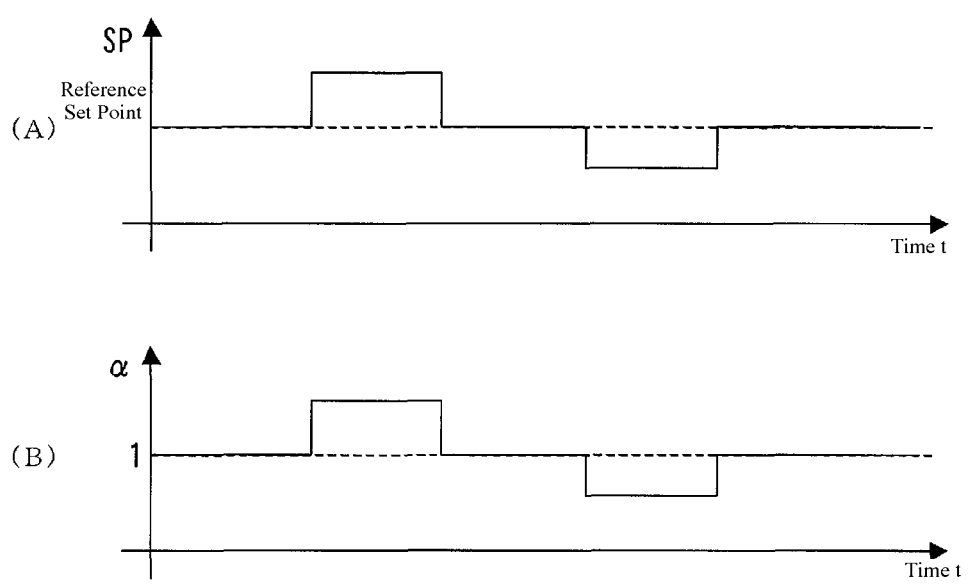
FIG. 4 is a diagram illustrating an example of a cooperative pattern between the set points and the variable amplification in the Example according to the present disclosure.

FIG. 4 (A) and FIG. 4 (B), as with FIG. 3 (A) through FIG. 3 (D), show examples of actuator gain-linkage patterns when set point changes are made intentionally, through a step-response approach, multiple times. In this way it can be understood that each time there is a step input for the set point SP, the variable multiplier α is changed, and the actuator gain Kag is changed.

As described above, it each time the set point SP is changed in order to change intentionally the process variable PV for the purpose of energy conservation control or comfort control, the actuator gain is varied, linked to the change in the set point SP, to enable an improvement in the responsiveness of the feedback control without changing the control parameters. Note that in order to ensure convergence of the process variable PV to the set point SP, preferably the actuator gain is varied within the range of robust stability.

Another Example

Another Example according to the present disclosure will be explained next. In the present example, the explanation will use, as one example of linked control of the actuator gain, changing the actuator gain through changing the temperature of a thermal medium, such as water or air, in an air conditioning controlling system that is provided with a control loop for controlling room temperature through supply air flow rate control and a control loop for controlling the supply air temperature. In the present example, the example of a supply air temperature will be used as a specific example of a thermal medium temperature. In an air conditioner system to which the present example can be applied, it must be possible to set the room temperature and to set the supply air temperature.

Figure 5:
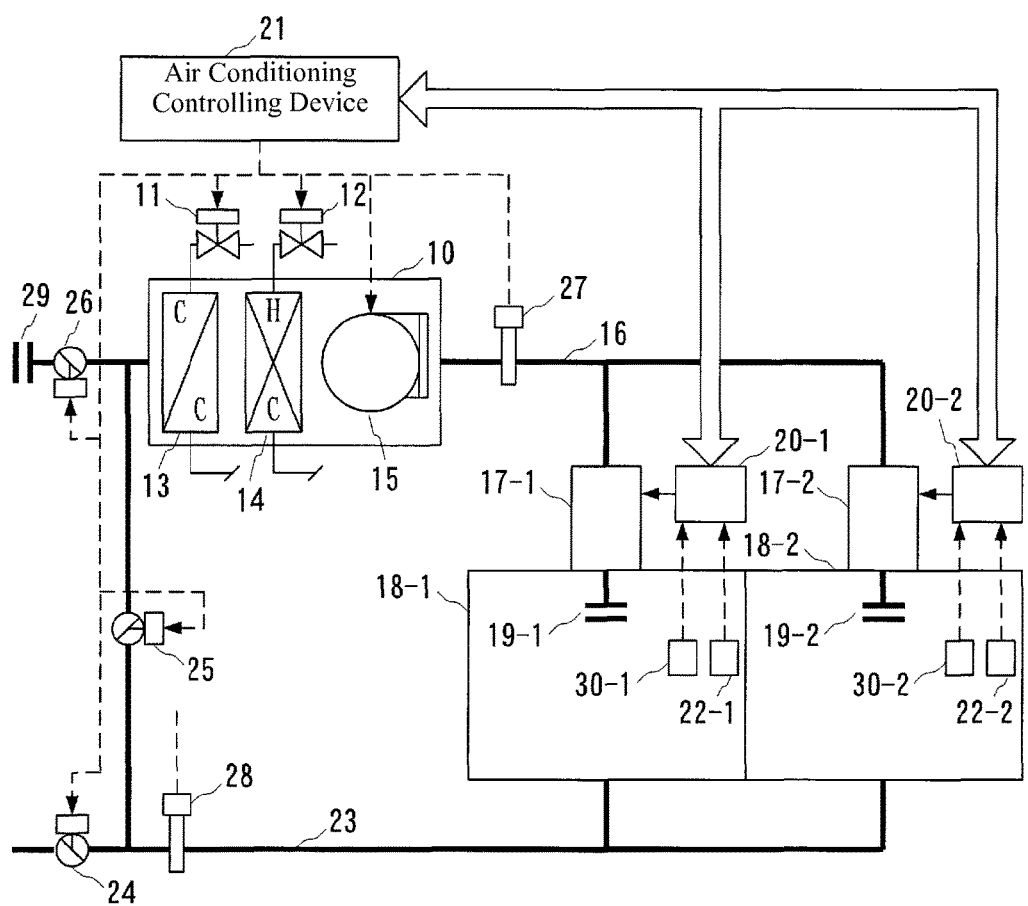
FIG. 5 is a block diagram illustrating a configuration of a VAV air-conditioning system according to Another Example according to the present disclosure.

FIG. 5 is a block diagram illustrating a configuration of a VAV (Variable Air Volume) air-conditioning system according to the Another Example according to the present disclosure. The VAV air-conditioning system of the present example includes: an air conditioner 10; a cold water valve 11 for controlling the quantity of cold water to the air conditioner 10; a hot water valve 12 for controlling the quantity of hot water to the air conditioner 10; a supply air duct 16 for providing supply air from the air conditioner 10 to the air-conditioned zones 18-1 and 18-2; VAV unit 17-1 and 17-2 for controlling, for each air-conditioned zone, the quantity of supply air supplied to the air-conditioned zones 18-1 and 18-2; VAV controllers 20-1 and 20-2 that are devices for controlling the VAV units 17-1 and 17-2; an air conditioning controlling device 21 for controlling the air conditioner 10; room temperature sensors 22-1 and 22-2 for measuring the room temperatures of the air-conditioned zones 18-1 and 18-2; a return air duct 23; an exhaust air adjusting damper 24 for adjusting the volume of air that is exhausted to the outside; a return air adjusting damper 25 for adjusting the volume of return air that is returned to the air conditioner 10; an outside air adjusting damper 26 for adjusting the volume of outside air drawn in to the air conditioner 10; a temperature sensor 27 for measuring the supply air temperature; and a temperature sensor 28 for measuring the return air temperature.

The air conditioner 10 is structured from a cooling coil 13, a heating coil 14, and a fan 15. VAV units 17-1 and 17-2 and VAV controllers 20-1 and 20-2 are provided for each air-conditioned zone. Dampers, not shown, are provided within the VAV units 17-1 and 17-2, so as to be able to adjust the volumes of supply air that pass through the VAV units 17-1 and 17-2. In FIG. 5, 19-1 and 19-2 are blowing vents for the supply air from the air conditioner 10, 29 is an outside air intake vent, and 30-1 and 30-2 are remote control terminals provided in the air conditioned zones 18-1 and 18-2.

Within the air conditioner 10, the speed of rotation of the fan 15 and the degrees of opening of the cold water valve 11 and the hot water valve 12 are controlled by the air conditioning controlling device 21. When cooling the air conditioner air (or in general, during a cooling operation), the volume of cold water supplied to the cooling coil 13 of the air conditioner 10 is controlled by the cold water valve 11. On the other hand, when heating the air conditioner air (or in general, during a heating operation), the volume of hot water supplied to the heating coil 14 of the air conditioner 10 is controlled by the hot water valve 12.

The air that is cooled by the cooling coil 13 or the air that is heated by the heating coil 14 is blown out by the fan 15. The air that is blown out by the fan 15 (that is, the supply air) is supplied through the supply air duct 16 to the VAV units 17-1 and 17-2 of each of the air-conditioned zones 18-1 and 18-2, so as to be supplied to each of the air-conditioned zones 18-1 and 18-2 through the VAV units 17-1 and 17-2.

The VAV controllers 20-1 and 20-2 calculate operating quantities MV (the required air flow rates for the air-conditioned zones 18-1 and 18-2) based on the deviations between the room temperatures PV, measured by the room temperature sensors 22-1 and 22-2 in the air-conditioned zones 18-1 and 18-2, and the room temperature set points SP, and send the required air flow rate values to the air conditioning controlling device 21, and also control the openings of the dampers (not shown) within the VAV units 17-1 and 17-2 so as to ensure the required air flow rates.

The air conditioning controlling device 21 calculates a total required air flow rate value for the system as a whole from the required air flow rate values that are sent from the individual VAV controllers 20-1 and 20-2, calculates the rotational speed of the fan in accordance with the total required air flow rate value, and controls the air conditioner 10 so as to produce the calculated fan rotational speed.

The supply air that passes through the VAV units 17-1 and 17-2 to be blown out from the blower thence 19-1 and 19-2 into the air-conditioned zones 18-1 and 18-2, after contributing to the cooling control in the air-conditioned zones 18-1 and 18-2, passes through the return air duct 23 to be exhausted through the exhaust air adjusting damper 24, but a portion thereof is returned to the air conditioner 10 as return air through the return air adjusting damper 25. Following this, outside air is drawn in, through the outside air adjusting damper 26, at a specific proportion relative to the return air that is returned to the air conditioner 10. The respective degrees of opening of the exhaust air adjusting damper 24, the return air adjusting damper 25, and the outside air adjusting damper 26 are controlled by the air conditioning controlling device 21.

The air conditioning controlling device 21, at the time of a cooling operation by the air conditioner 10, sets the degree of opening of the hot water valve 12 to 0% and controls the degree of opening of the cold water valve 11 so that the supply air temperature measured value SAPV, measured by the temperature sensor 27, will match the supply air temperature set point SASP. Moreover, the air conditioning controlling device 21, at the time of a heating operation by the air conditioner 10, sets the degree of opening of the cold water valve 11 to 0% and controls the degree of opening of the hot water valve 12 so that the supply air temperature measured value SAPV, measured by the temperature sensor 27, will match the supply air temperature set point SASP. Typically, if the deviation between the room temperature PV and the room temperature set point SP is not resolved within a specific amount of time, the supply air temperature SAPV is changed in accordance with a request to increase the cooling capability or a request to increase the heating capability, sent from the individual VAV controllers 20-1 and 20-2. The operation set forth above is the same as in the conventional VAV air conditioning system.

Figure 6:
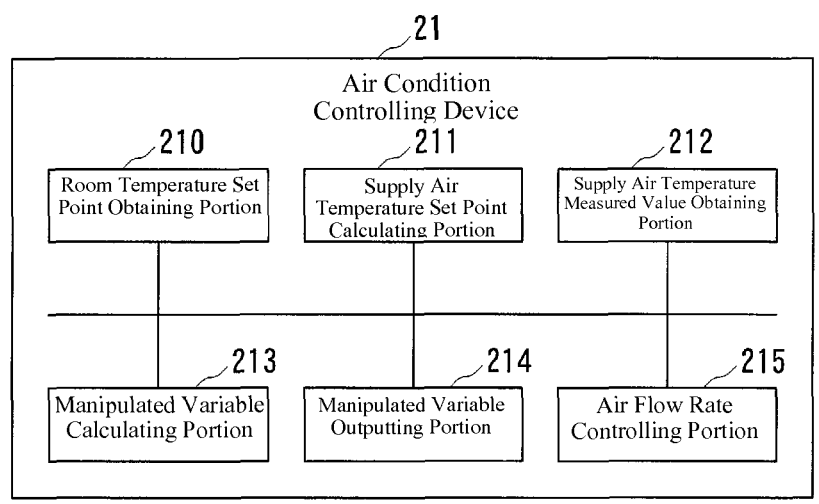
FIG. 6 is a block diagram illustrating a structure of an air conditioning controlling device of a VAV air-conditioning system according to the Another Example according to the present disclosure.
Figure 7:
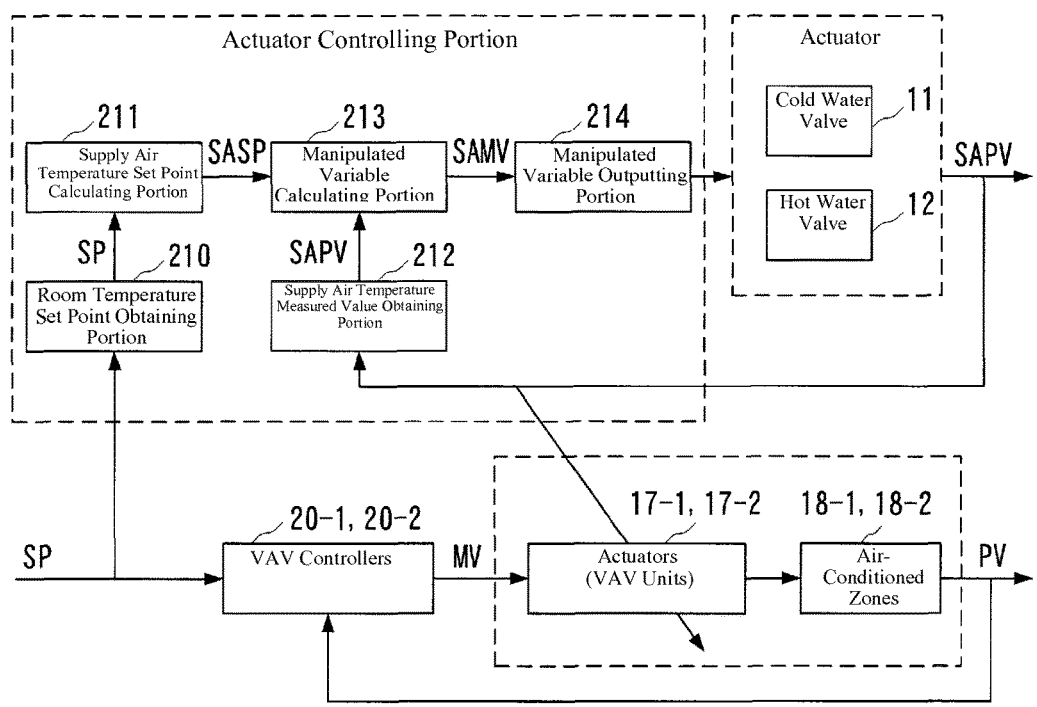
FIG. 7 is a block diagram illustrating a structure of process control feedback controlling system and actuator gain controlling system according to the Another Example according to the present disclosure.

The distinctive characteristics of the present example will be explained next. FIG. 6 is a block diagram illustrating a structure of an air-conditioner controlling device 21, and FIG. 7 is a diagram illustrating a structure for a process control feedback (FB) controlling system and actuator gain (AG) controlling system according to the present example.

The air conditioning controlling device 21 includes: a room temperature set point obtaining portion 210 for obtaining a room temperature set point SP, a supply air temperature set point calculating portion 211 for calculating a supply air temperature set point SASP in response to the room temperature set point SP, a supply air temperature measured value obtaining portion 212 for obtaining a supply air temperature SAPV that is measured by a temperature sensor 27, a manipulated variable calculating portion 213 for calculating manipulated variables SAMV that indicate the degrees of opening of a cold water valve 2 and a hot water valve 3, a manipulated variable outputting portion 214 for outputting the manipulated variables SAMV to the cold water valve 2 and the hot water valve 3, and an air flow rate controlling portion 215 for controlling a fan 15 of an air conditioner 10.

The room temperature set point obtaining portion 210 corresponds to the set point obtaining portion 5 in FIG. 1. The supply air temperature set point calculating portion 211, the supply air temperature measured value obtaining portion 212, the manipulated variable calculating portion 213, and the manipulated variable outputting portion 214 correspond to the actuator controlling portion 6 in FIG. 1. VAV controllers 20-1 and 20-2 correspond to the set point inputting portion 1, the process variable inputting portion 2, the manipulated variable calculating portion 3, and the manipulated variable outputting portion 4 of FIG. 1. VAV units 17-1 and 17-2 correspond to the actuator 8 in FIG. 1. Air conditioning zones 18-1 and 18-2 correspond to the control object 9 in FIG. 1.

Consequently, the feedback (FB) control system is structured from the VAV controllers 20-1 and 20-2, the VAV units 17-1 and 17-2, and the air conditioning zones 18-1 and 18-2, where the actuator gain (AG) control system is structured from the room temperature set point obtaining portion 210, the supply air temperature set point calculating portion 211, the supply air temperature measurement value obtaining portion 212, the manipulated variable calculating portion 213, and the manipulated variable outputting portion 214.

In the present example, in the VAV air conditioning system as set forth above, when the room temperatures set point SP is changed in order to change intentionally the room temperature PV for the purpose of energy conservation control or comfort control, changing the supply air temperature set point SASP in cooperation with the change in the room temperature set point SP changes the supply air temperature SAPV to improve the responsiveness of the temperature control. Because the supply air flow rate that is required in the room temperature control in the feedback controlling system depends on the supply air temperature SAPV, changing the supply air temperature SAPV means changing the actuator gain.

Figure 8:
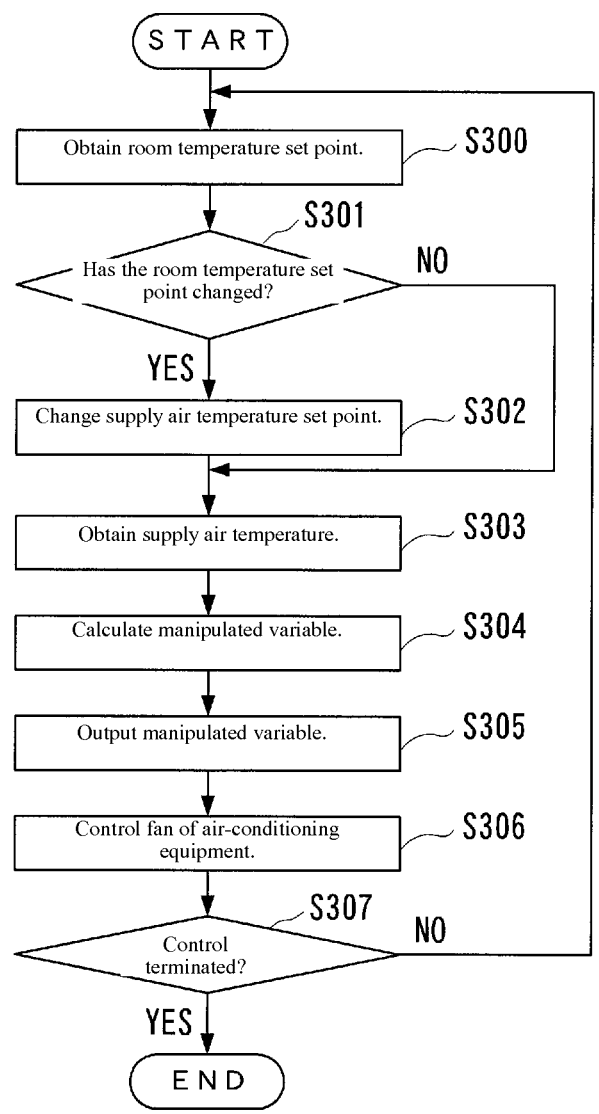
FIG. 8 is a flowchart illustrating the operation of the air conditioning controlling device of a VAV air-conditioning system according to the Another Example according to the present disclosure.

FIG. 8 is a flowchart illustrating the operation of the air conditioner controlling device 21. The room temperature set point obtaining portion 210 obtains the room temperature set point SP (Step S300 in FIG. 8). The room temperature set point SP is set in advance to a reference set point, which is a control set point for constant room temperature control, and is changed intentionally from the reference set point for the purpose of, for example, energy conservation control or comfort control.

If the room temperature set point SP obtained by the room temperature set point obtaining portion 210 has been changed relative to the immediately previous room temperature set point SP (the reference set point) (YES in Step S301 in FIG. 8), then the supply air temperature set point calculating portion 211 changes the supply air temperature set point SASP in accordance with the magnitude of change relative to the immediately previous room temperature set point SP (Step S302 in FIG. 8).

The supply air temperature set point calculating portion 211 calculates a post-change supply air temperature set point SASP' by, for example, multiplying the pre-change supply air temperature set point SASP by the variable multiplier α (where A is a real number greater than 0). A change in the supply air temperature set point SASP can be achieved through changing the variable multiplier α in Equation (7) in accordance with the magnitude of the change in the room temperature set point SP. At this time, the supply air temperature set point calculating portion 211 determines the variable multiplier α so as to change the supply air temperature set point SASP more greatly the larger the magnitude of change of the room temperature set point SP.

$$SASP' = \alpha \times SASP \qquad (7)$$

The supply air temperature measured value obtaining portion 212 obtains the supply air temperature SAPV measured by the temperature sensor 27 (Step S303 in FIG. 8).

The manipulated variable calculating portion 213 calculates operating quantities SAMV in accordance with a specific control calculating algorithm so that the supply air temperature SAPV will match the supply air temperature set point SASP (Step S304 in FIG. 8). The operating volume outputting portion 214 outputs, to the cold water valve 2 and the hot water valve 3, the operating quantities SAMV calculated by the operating volume calculating portion 213 (Step S305 in FIG. 8). The degrees of opening of the cold water valve 11 and the hot water valve 12 are controlled in this way, to control the volume of the thermal medium (cold water or hot water) that is supplied to the air conditioner 10. Note that, as described above, when the air conditioner 10 is performing a cooling operation, the degree of opening of the hot water valve 12 is constantly a minimum value that has been specified in advance (which normally is near to 0%), and when the air conditioner 10 is performing a heating operation, the degree of opening of the cold water valve 11 is constantly a minimum value that has been specified in advance (which normally is near to 0%). The control calculating algorithm is, for example, a PID.

The air flow rate controlling portion 215 calculates a total required air flow rate value for the system as a whole from the required air flow rate values that are sent from the individual VAV controllers 20-1 and 20-2, calculates the rotational speed of the fan in accordance with the total required air flow rate value, and continuously controls, at regular intervals, the fan 15 of the air conditioner 10 so as to produce the calculated fan rotational speed. That is, the processes of the air flow rate controlling portion 215 are not limited to when the supply air temperature is changed through S300 through S305, but rather perform fan air flow rate control continuously (Step S306 in FIG. 8).

The air conditioning controlling device 21 performs the processes in Step S300 through S305, as described above, at regular intervals until an instruction from, for example, a resident or the air-conditioning controller, to terminate the air conditioning control (YES in FIG. 8: Step S307). The processes in Step S300, S301, and S302 in FIG. 8 correspond, respectively, to those in Step S200, S201, and S202 in FIG. 2 (B).

When the room temperature PV is changed for the purpose of energy conservation control or comfort control, then, for example, in the operation for intentionally easing the room temperature set point SP in a stepwise manner, linkage patterns between the room temperature set point SP and the variable multiplier α such as shown in FIG. 4 (A) and FIG. 4 (B) in the Example can be applied.

Figure 9:
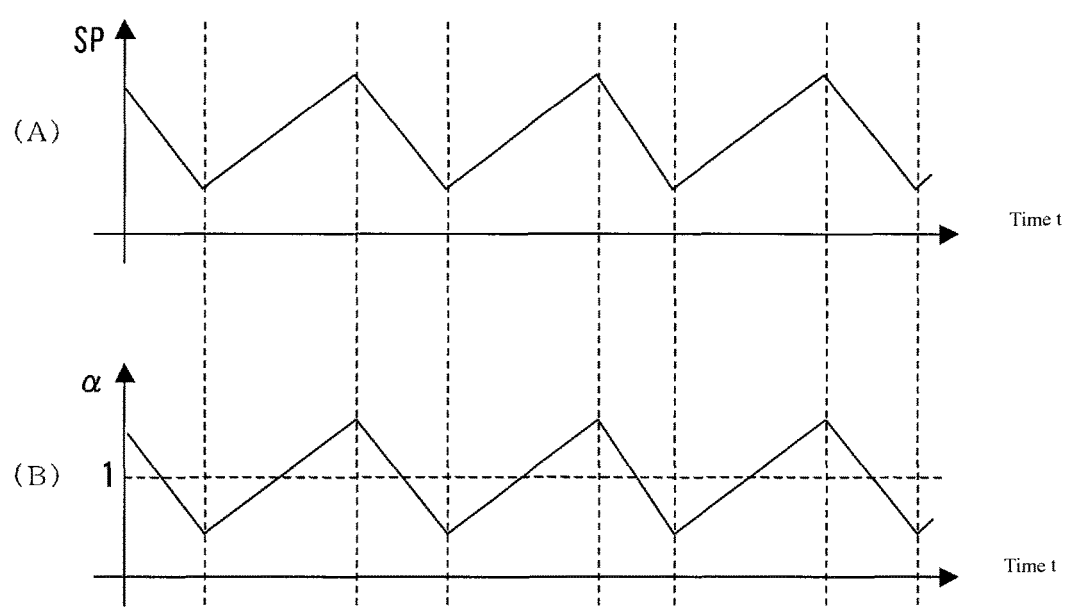
FIG. 9 is a diagram illustrating an example of a cooperative pattern between the room temperature set points and the variable amplification in the Another Example according to the present disclosure.

Moreover, examples of linkage patterns between the room temperature set point SP and the variable multiplier α that are applied on a schedule wherein the temperature is ramped up and down continuously, as disclosed in Mizutani are shown in FIG. 9 (A) and FIG. 9 (B).

Figure 10:
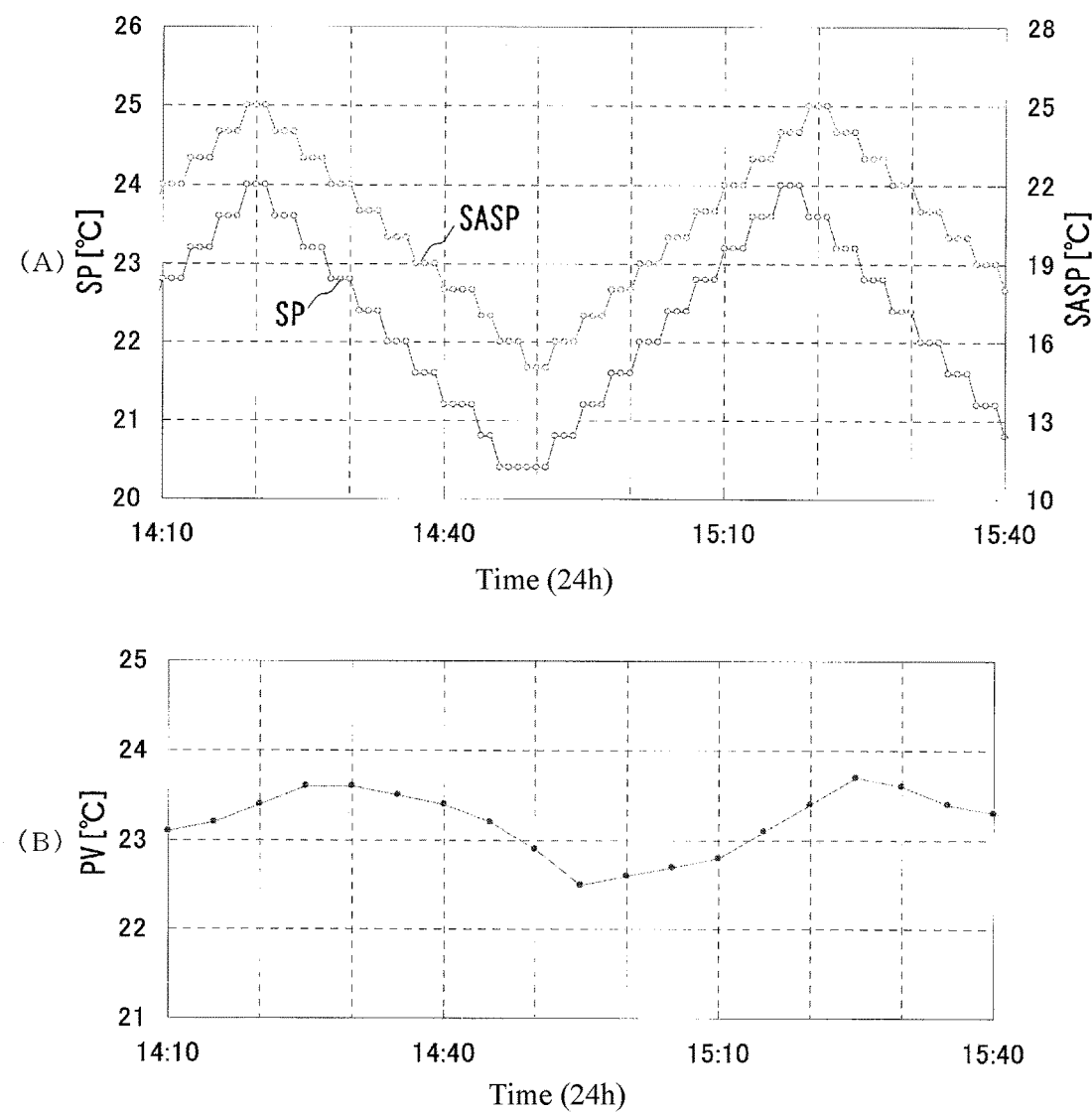
FIG. 10 is a diagram illustrating an example of operation of a VAV air-conditioning system according to the Another Example according to the present disclosure.

The results of applying the linkage patterns illustrated in FIG. 9 (A) and FIG. 9 (B) to air conditioning zones in an actual building are shown in FIG. 10 (A) and FIG. 10 (B). FIG. 10 (A) shows the changes in the room temperature set point SP and the supply air temperature set point SASP, and FIG. 10 (B) shows the changes in the room temperature PV. It can be understood from the site application data shown in FIG. 10 (B), where the magnitude of change of the room temperature PV in an actual occupied area, relative to the magnitude of change of the room temperature set point SP is small, that it is difficult to change the actual room temperature PV by changing the room temperature set point SP alone.

As described above, in the present example, when there is a change in the room temperature set point SP in order to change the room temperature PV intentionally for the purpose of energy conservation control or comfort control, it is possible to improve the responsiveness of the room temperature control through changing the supply air temperature SAPV depending on the change in the room temperature set point SP so that the change in the room temperature PV that is produced by the change in the actuator gain (the noise) will have the effect of following the change in the room temperature set point SP. Note that in order to ensure convergence of the room temperature PV to the room temperature set point SP, preferably the supply air temperature SAPV is varied within the range of robust stability.

Figure 11:
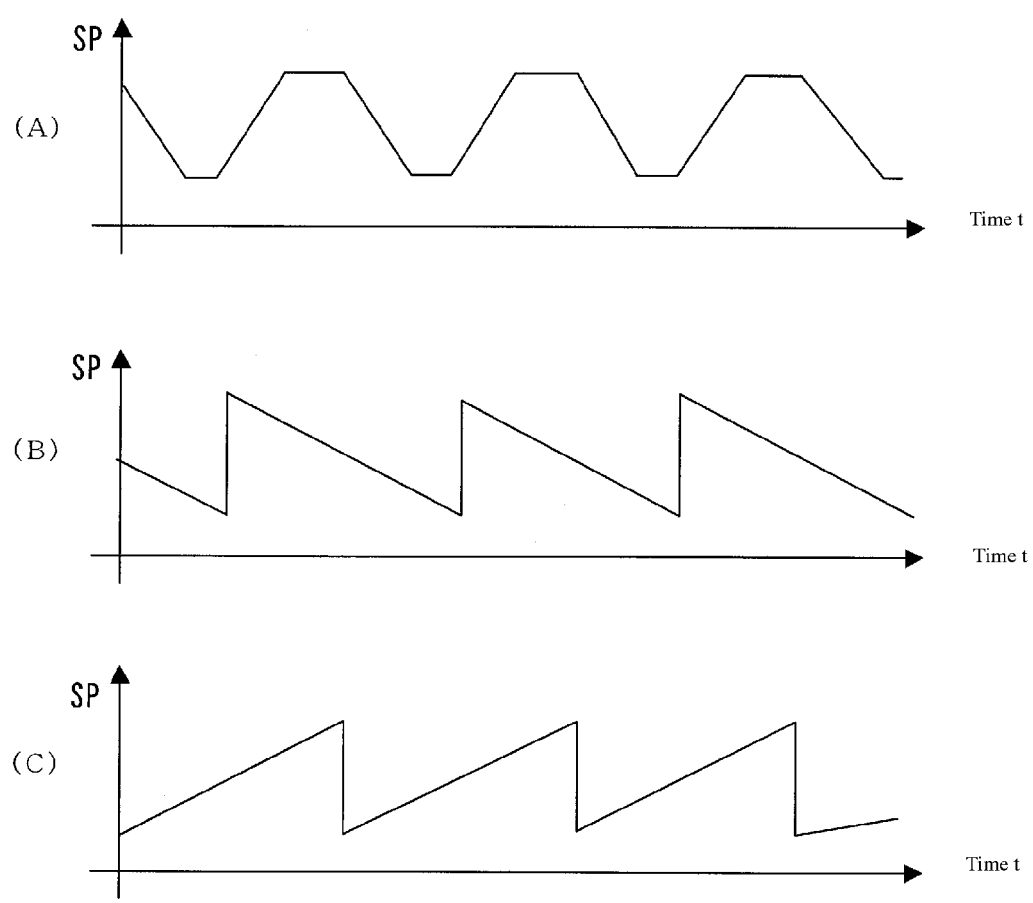
FIG. 11 is a diagram illustrating another example of a variation pattern of the room temperature set points in the Another Example according to the present disclosure.

Moreover, while in the present example the explanation used the case of FIG. 9 (A) as an example of a pattern wherein the room temperature set point SP is changed through ramping, there is no limitation thereto, but rather there are also those change patterns shown in FIG. 11 (A) through FIG. 11 (C) for the room temperature set point SP. For any of these patterns in FIG. 11 (A) through FIG. 11 (C), the supply air temperature SAPV may be changed in cooperation with changes in the room temperature set point SP.

Yet Another Example

Yet Another Example according to the present disclosure will be explained next. The present example illustrates another example of linkage patterns between the set point SP and the variable multiplier α in the Example and the Another Example, showing an example that contemplates control deviation in the feedback control system. When the actuator gain is changed reflecting the magnitude of the control deviation in the feedback control system, not only is the responsiveness of the feedback control when the set point SP is changed improved, but the convergence of the feedback control is improved as well.

In the Example and the Another Example, the greater the magnitude of change of the set point SP, that is, the greater the control deviation Δ|SP−PV|, the greater the change in the actuator gain, but because convergence of the feedback controlling system is ensured to some degree by the control parameter adjustments at the time at which control is implemented, the variable multiplier α should be determined so that the variable multiplier α is smaller the longer the time that has elapsed after the change in the set point SP.

Figure 12:
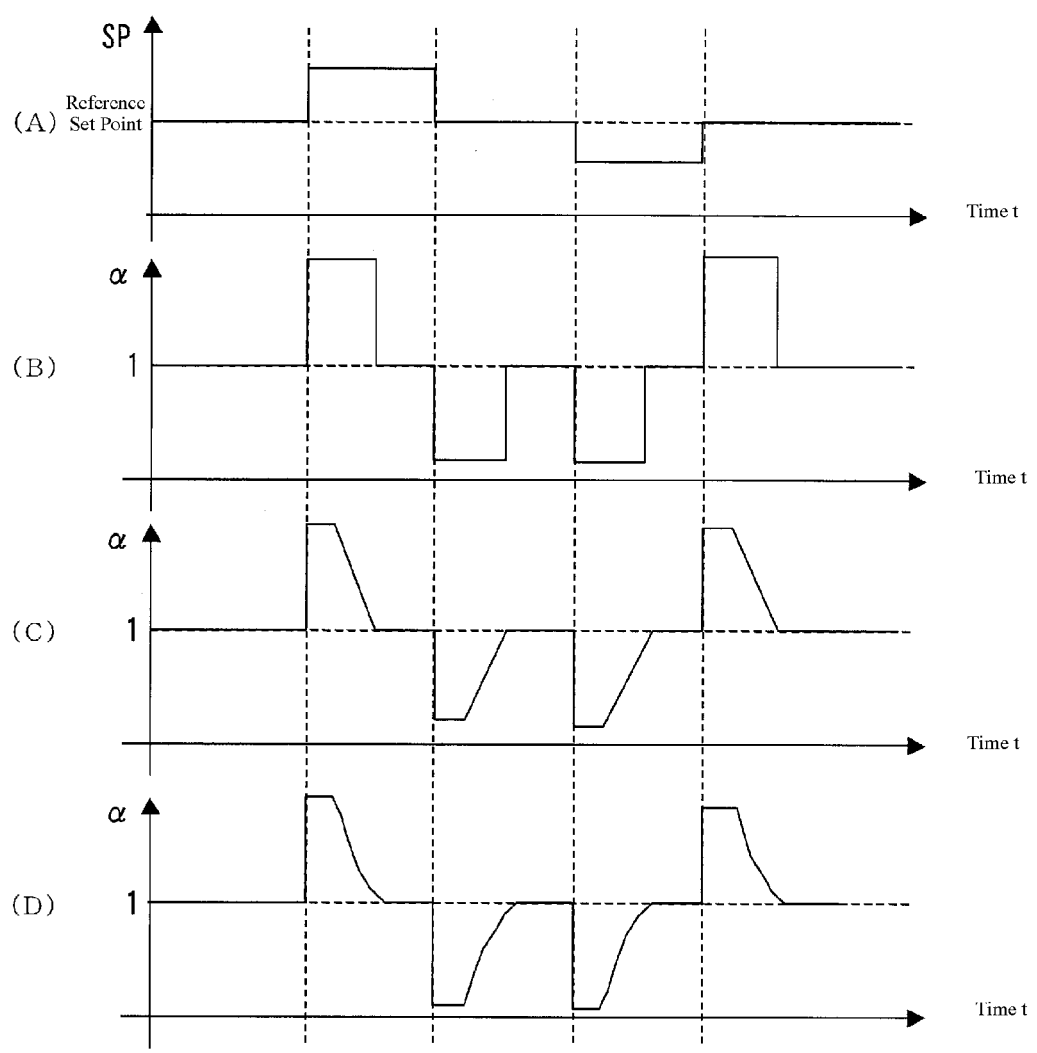
FIG. 12 is a diagram illustrating an example of a cooperative pattern between the set points and the variable amplification in Yet Another Example according to the present disclosure.

Examples of linkage patterns for changing the actuator gain while taking the control deviation into account, for stepwise changes in the set point SP, in the same manner as illustrated in FIG. 4 (A), are illustrated in FIG. 12 (A) through FIG. 12 (D). FIG. 12 (B) shows an example wherein the variable multiplier α is changed in a stepwise manner depending on the time that has elapsed since the point in time of a change in the set point SP, so as to return to the pre-change value for α after the variable multiplier α has been changed in response to a change in the set point SP.

FIG. 12 (C) illustrates an example wherein the variable multiplier α is determined in accordance with the amount of time that has elapsed from the point in time of a change in the set point SP through the use of a linear function showing the relationship between the elapsed time after the change in the set point SP and the variable multiplier α. FIG. 12 (D) illustrates an example wherein the variable multiplier α is determined in accordance with the amount of time that has elapsed from the point in time of a change in the set point SP through the use of a nonlinear function showing the relationship between the elapsed time after the change in the set point SP and the variable multiplier α. As described above, the determination of the variable multiplier α may be made in the actuator controlling portion 6 of the Example or in the supply air temperature set point calculating portion 211 of the Another Example.

Figure 13:
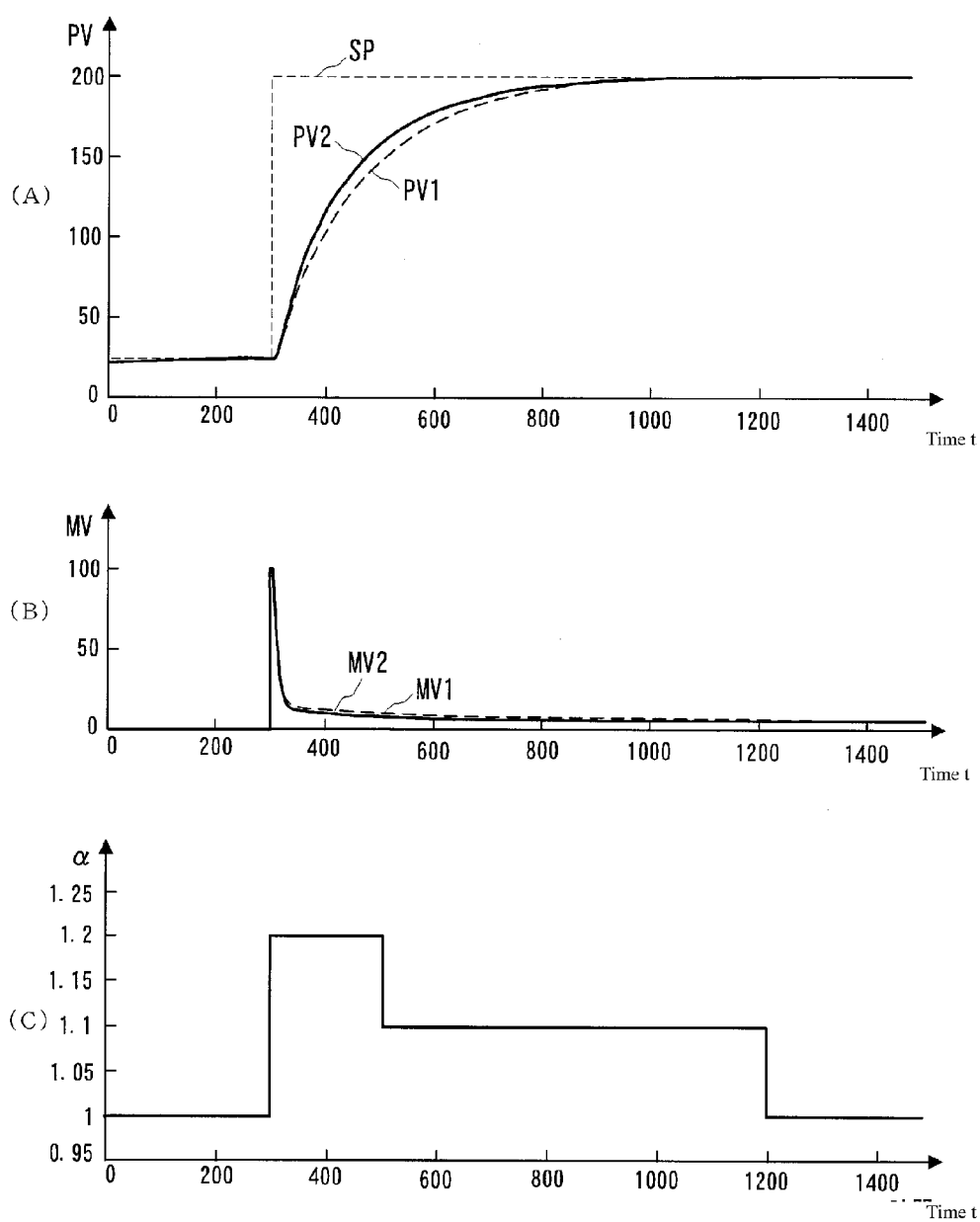
FIG. 13 is a diagram illustrating an example of operation according to the Yet Another Example according to the present disclosure.

FIG. 13 (A) through FIG. 13 (C) show the results of simulations that show the effects of the present example. Here examples wherein the set point SP and the variable multiplier α are linked by the types in FIG. 12 (B) are shown. FIG. 13 (A) shows the change in the process variable PV when the set point SP=25 is changed to SP=200 at time t=300, FIG. 13 (B) shows the change in the manipulated variable MV at the time of this set point change, and FIG. 13 (C) shows the change in the variable multiplier α.

PV1 in FIG. 13 (A) is the process variable PV in a case wherein the actuator gain does not change, such as in the conventional technology, and PV2 is the process variable PV for a case wherein the variable multiplier α is changed as in FIG. 13 (C). MV1 in FIG. 13 (B) is the manipulated variable MV in a case wherein the actuator gain does not change and MV2 is the manipulated variable MV for a case wherein the variable multiplier α is changed as in FIG. 13 (C).

As explained with FIG. 12 (B), in this simulation the variable multiplier α is changed in a stepwise manner depending on the amount of time that has elapsed from the point in time of a change in the set point SP. It can be understood from FIG. 13 (A) through FIG. 13 (C) that, when compared to the case wherein the actuator gain does not change, as in the conventional technology (where the variable multiplier α is always 1), the asymptotic approach of the process variable PV to the set point SP is faster, improving the responsiveness of the feedback control, when actuator gain-linked control of the present example is performed.

Further Example

Further Example according to the present disclosure will be explained next. The present example illustrates another example of linkage patterns between the set point SP and the variable multiplier α in the Example and the Another Example, showing an example that contemplates a time delay in the feedback control system. When the actuator gain is changed with a time delay in the feedback control system, not only is the responsiveness of the feedback control when the set point SP is changed improved, but the convergence of the feedback control is improved as well. The greater the time delay of the control object, the faster the change in the actuator gain.

Figure 14:
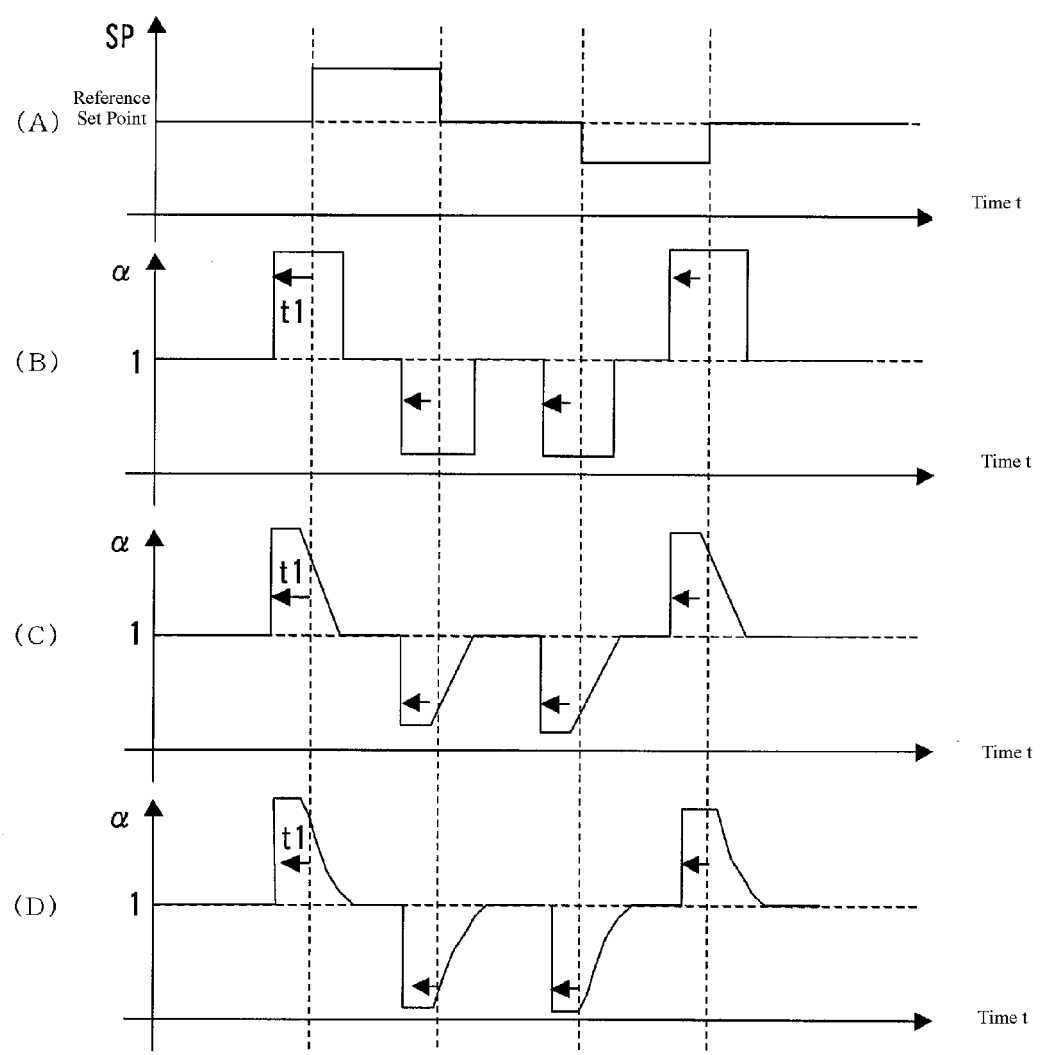
FIG. 14 is a diagram illustrating an example of a cooperative pattern between the set points and the variable amplification in Further Example according to the present disclosure.

Examples of linkage patterns for changing the actuator gain while taking the time delay of the feedback system into account, for stepwise changes in the set point SP, in the same manner as illustrated in FIG. 4 (A), are illustrated in FIG. 14 (A) through FIG. 14 (D). In the examples illustrated in FIG. 14 (A) through FIG. 14 (D), the change in the actuator gain (the variable multiplier α) begins a specific amount of time t1 prior to the change in the set point SP. If the time delay of the control subject (the delay time of the room temperature PV relative to the set point SP) is roughly known, then this specific amount of time t1 may be set to this value, where the response data of the room temperature PV when t1=0 (when a linkage pattern that does not take the delay time into consideration is applied) may be obtained, and the delay time for the room temperature PV relative to the set value SP, obtained from that data, may be set.

FIG. 14 (B) shows an example wherein change in the actuator gain (the variable multiplier α) is started a specific time t1 earlier than the change in the set point SP, for the example in FIG. 12 (B) wherein the variable multiplier α is changed in a stepwise manner depending on the amount of time that has elapsed after a change in the set point SP. FIG. 14 (C) shows an example wherein the change in the actuator gain (the variable multiplier α) is started a specific amount of time t1 prior to the change in the set point SP, in contrast to the example in FIG. 12 (C), wherein the variable multiplier α is determined, using a linear function that shows the relationship between the variable multiplier α and the elapsed time after the change in the set point SP, depending on the amount of time that has elapsed after the change in the set point SP. FIG. 14 (D) shows an example wherein the change in the actuator gain (the variable multiplier α) is started a specific amount of time t1 prior to the change in the set point SP, in contrast to the example in FIG. 12 (D), wherein the variable multiplier α is determined, using a nonlinear function that shows the relationship between the variable multiplier α and the elapsed time after the change in the set point SP, depending on the amount of time that has elapsed after the change in the set point SP. The determination of this type of variable multiplier α may be made in the actuator controlling portion 6 of the Example or in the supply air temperature set point calculating portion 211 of the Another Example.

Figure 15:
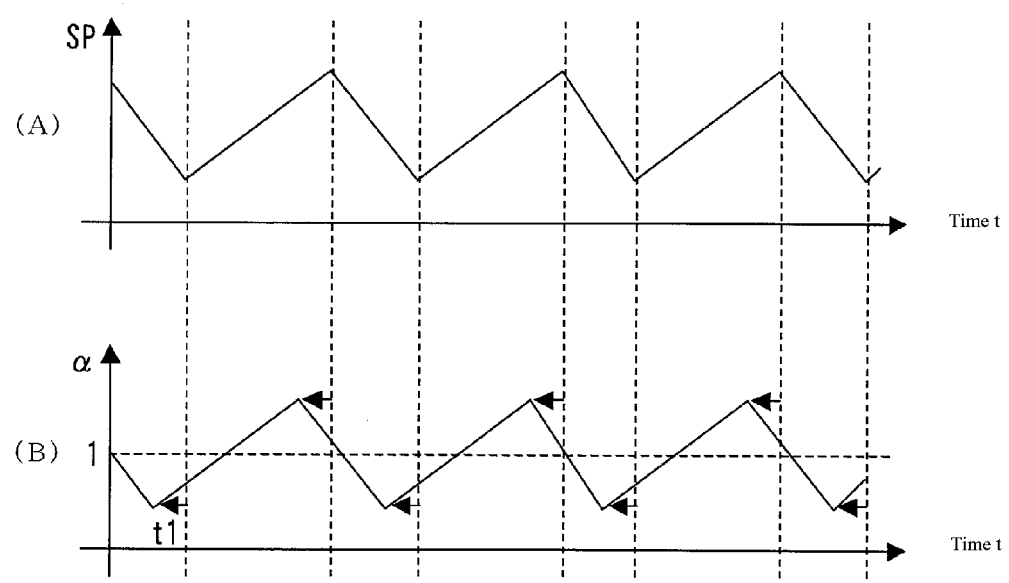
FIG. 15 is a diagram illustrating another example of a cooperative pattern between the set points and the variable amplification in the Further Example according to the present disclosure.

Examples of linkage patterns for changing the actuator gain while taking the time delay of the feedback system into account, for ramped changes in the set point SP, in the same manner as illustrated in FIG. 9 (A), are illustrated in FIG. 15 (A) and FIG. 15 (B).

As shown above, in the present example changing the variable multiplier α and changing the actuator gain, taking the time delay of the feedback control system into account makes it possible to improve the responsiveness of the feedback control and to improve the convergence of control as well.

Note that because changing the actuator gain prior to a change in the set point SP is difficult, in actual control the signal that provides advance notification of a change in the set point SP and of the magnitude of that change is received from the changing means (not shown) for producing the change in the set point SP. For example, classically in changing means for producing a change in the set point SP, there have been those wherein information regarding the change pattern of the set point SP is scheduled in advance, such as in the Another Example. Through this, it is possible to change the gain of the actuator at the specific time t1 in advance of changing the set point SP.

Another Further Example

Another Further Example according to the present disclosure will be explained next. The present example illustrates another example of a linkage pattern between the set point SP and the variable multiplier α in the Example and the Another Example, and illustrates an example wherein, in addition to taking into consideration the time lag in the feedback control system, in the same manner as with the Further Example, the overshoot of the process variable PV at the transition point of the set point SP is taken into account. There is a tendency for overshoot to occur in the process variable PV in the direction in which the set point is changing prior to the transition point, in the vicinity of the transition point wherein the set point SP, which is changing through ramping, transitions from ramping up to ramping down or in the vicinity of the transition point for the transition from ramping down to ramping up. The object of the present example is to prevent the occurrence of such overshoot.

Figure 16:
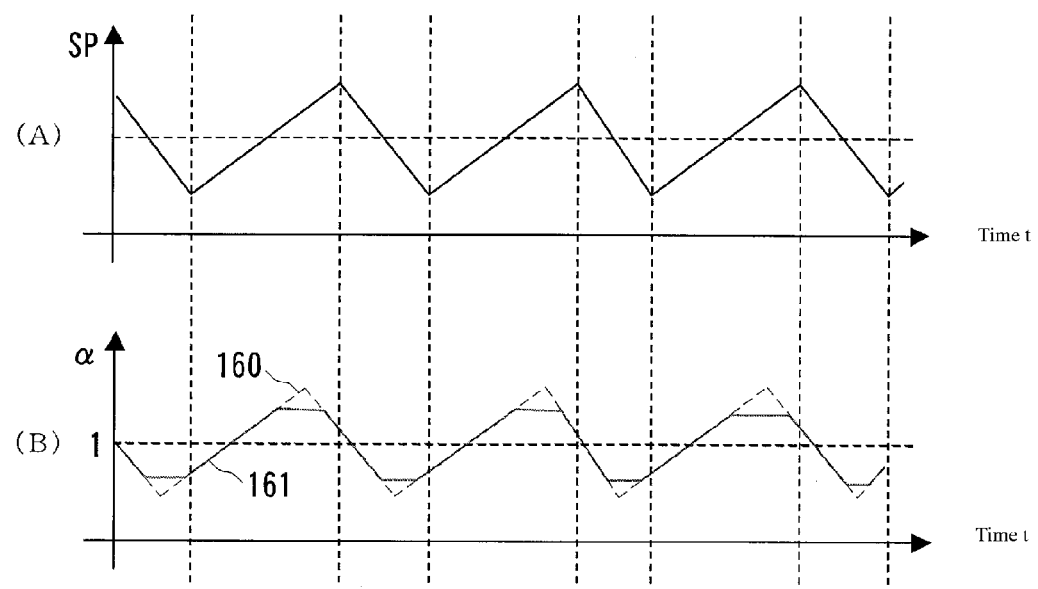
FIG. 16 is a diagram illustrating an example of a cooperative pattern between the set points and the variable amplification in Another Further Example according to the present disclosure.

For the ramped change in the set point SP, an example of a linkage pattern which varies the actuator gain while taking in consideration the overshoot of the process variable PV at the transition point for the set point SP while taking into consideration the time delay in the feedback control system for the ramped change of the set point SP, in the same manner as that which is illustrated in FIG. 9 (A) is illustrated in FIG. 16 (A) and FIG. 16 (B). In FIG. 16 (B), 160 shows an example of a linkage pattern of the Further Example, and 161 shows an example of a linkage pattern of the Another Further Example.

In this way, at the same time as changing the variable multiplier α while considering the time lag in the feedback control system in the present example, the cessation of the change in the actuator gain by holding the variable multiplier α constant in the vicinity of the transition point from rising to falling, or the transition point from falling to rising, of the set point SP makes it possible to produce the effect of preventing overshoot of the process variable PV, in addition to the effect explained in the Further Example, making it possible to increase the convergence of the process variable PV to the set point SP.

Yet Another Further Example

Figure 17:
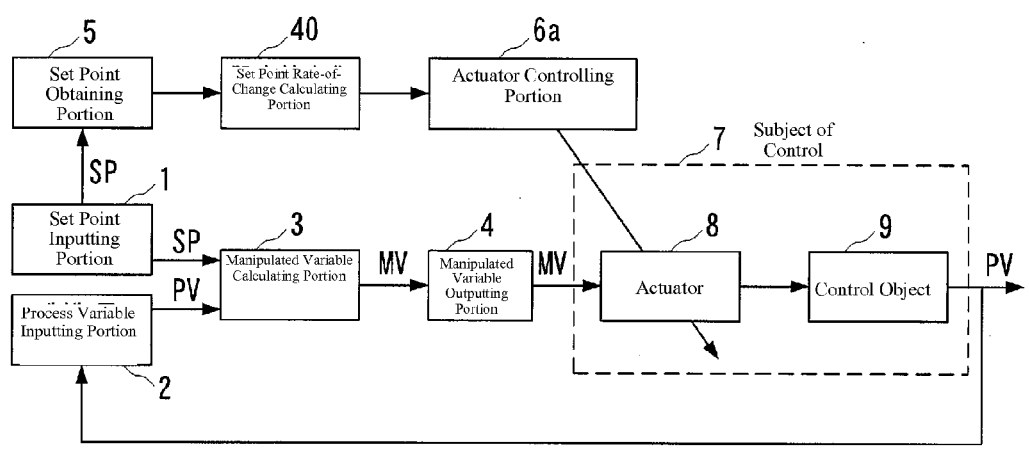
FIG. 17 is a block diagram illustrating a structure of a controlling device according to Yet Another Further Example according to the present disclosure.

Yet Another Further Example according to the present disclosure will be explained next. While, in the Example, the Another Example, the Yet Another Example, the Further Example and the Another Further Example, the actuator gain was changed in accordance with the magnitude of change of the set point SP, instead the actuator gain may be changed in accordance with the rate of change of the set point SP. FIG. 17 is a block diagram illustrating the structure of a controlling device according to the present example, where structures identical to those in FIG. 1 are assigned identical codes.

The controlling device according to the present example includes: a set point inputting portion 1, a process variable inputting portion 2, a manipulated variable calculating portion 3, a manipulated variable outputting portion 4, a set point obtaining portion 5, an actuator controlling portion 6a, and a set point change rate calculating portion 40 for calculating the rate of change of the set point SP. The set point obtaining portion 5, the set point change rate calculating portion 40, and the actuator controlling portion 6a structure the actuator gain (AG) control system.

Figure 18:
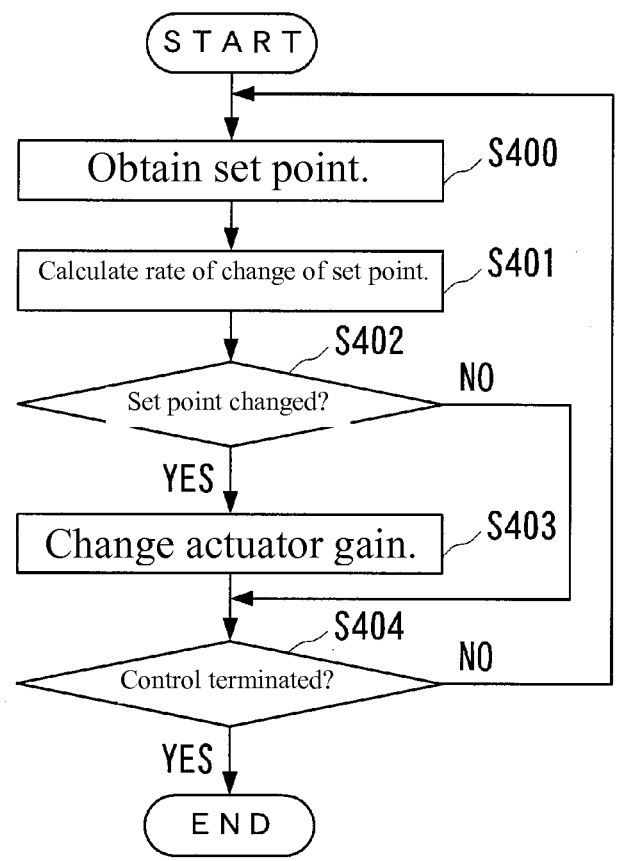
FIG. 18 is a flowchart illustrating the operation of the actuator gain controlling system according to the Yet Another Further Example according to the present disclosure.

FIG. 18 is a flowchart illustrating the operation of an actuator gain (AG) controlling system according to the present example. The process in Step S400 FIG. 18 is identical to that in Step S200 in FIG. 2 (B).

The set point change rate calculating portion 40 calculates the rate of change for the set point SP immediately previous to the set point SP obtained by the set point obtaining portion 5 (Step S401 in FIG. 18).

The actuator controlling portion 6a when the rate of change of the set point SP, calculated by the set point change rate calculating portion 40 has changed relative to the immediately previous rate of change, the change in the set point SP is detected (YES in Step S402 in FIG. 18), and the actuator gain Kag is changed in accordance with the rate of change of the set point SP (Step S403 in FIG. 18). The change in the actuator gain Kag can be achieved through changing, for example, the variable magnification α in Equation (5) in accordance with the rate of change of the set point SP. At this time, the actuator controlling portion 6a determines the variable multiplier α so as to cause the actuator gain Kag to change more greatly the larger the rate of change in the set point SP.

The processes in Step S400 through S403 as described above are repeated at regular intervals until the control is terminated through, for example, an instruction from an operator (YES in Step S404 in FIG. 18).

Note that while, in the Example, the Another Example, the Yet Another Example, the Further Example, the Another Further Example and the Yet Another Further Example, the explanations were for cases wherein the feedback control system for the subject was through reverse action, instead the present disclosure can be applied to a subject wherein the feedback control system is through direct action (wherein when there is an increase in the process variable PV, there is also an increase in the manipulated variable MV). Even when the feedback control system is through direct action, still the variable multiplier α should be determined in the same way as in the Example, the Another Example, the Yet Another Example, the Further Example, the Another Further Example and the Yet Another Further Example.

The controlling device explained in the first through sixth may be embodied through a computer that is equipped with a CPU, a storage device, and an interface, combined with a program for controlling these hardware resources. The CPU executes the processes explained in the Example, the Another Example, the Yet Another Example, the Further Example, the Another Further Example and the Yet Another Further Example, in accordance with a program that is stored in the memory device.

The present invention can be applied, in process control technologies, to technologies for varying process variables, such as room temperature, such as room temperatures, in order to improve energy conservation or comfort for occupants. Obviously, numerous modifications and variations of the present invention are possible in light of the above teachings. It is therefore to be understood that within the scope of the appended claims, the invention may be practiced otherwise than as specifically described herein.

The invention claimed is:

1. A controlling device comprising:
a set point obtaining portion that obtains a set point SP from a feedback control system that calculates, and outputs to an actuator, a manipulated variable MV based on the set point SP, which indicates a target condition for a control object, and on a process variable PV that is a measured value for the state of the control object; and
an actuator controlling portion that changes a gain of the actuator so as to have an effect wherein a change of the process variable PV that is produced through a change in the gain of the actuator tracks a change in the set point SP;
wherein the actuator controlling portion, after changing the gain of the actuator in accordance with a change in the set point SP, changes the gain of the actuator in accordance with time that has elapsed since the point in time of the change of the set point SP, so as to return to the value of the gain from prior to the change.

2. The controlling device as set forth in claim 1, wherein:
the feedback controlling system is a control loop that controls a room temperature through flow rate control of a thermal medium; and
the actuator controlling portion changes the gain of the actuator through controlling the temperature of the thermal medium in accordance with a change in the set point SP that indicates the target value for the room temperature.

3. The controlling device as set forth in claim 2, wherein:
the feedback controlling system is a control loop that controls a room temperature through flow rate control of supply air, which is a thermal medium;
the actuator is a VAV unit that adjusts the flow rate of the supply air; and
the actuator controlling portion changes the gain of the actuator through controlling the temperature of the supply air in accordance with a change in the set point SP that indicates the target value for the room temperature.

4. The controlling device as set forth in claim 1, wherein:
the actuator controlling portion changes the gain of the actuator through ramping in accordance with a ramped change in the set point SP.

5. The controlling device as set forth in claim 1, wherein:
the actuator controlling portion changes the gain of the actuator through stepping in accordance with a stepped change in the set point SP.

6. The controlling device as set forth in claim 1, wherein:
the actuator controlling portion changes the gain of the actuator in accordance with a magnitude of change or rate of change of the set point SP.

7. A controlling device comprising:
a set point obtaining portion that obtains a set point SP from a feedback control system that calculates, and outputs to an actuator, a manipulated variable MV based on the set point SP, which indicates a target condition for a control object, and on a process variable PV that is a measured value for the state of the control object; and
an actuator controlling portion that changes a gain of the actuator so as to have an effect wherein a change of the process variable PV that is produced through a change in the gain of the actuator tracks a change in the set point SP;

wherein the actuator controlling portion, when the control pattern of the set point SP is applied in advance, changes the gain of the actuator a certain amount of time prior to the change in the set point SP, depending on a signal that provides notification in advance of a change in the set point SP.

8. The controlling device as set forth in claim 7, wherein:
the actuator controlling portion causes the gain of the actuator to remain constant in the vicinity of a transition point of the set point SP from rising to falling or from falling to rising.

9. A controlling method, comprising:
a set point obtaining step for obtaining a set point SP from a feedback control system that calculates, and outputs to an actuator, a manipulated variable MV based on the set point SP, which indicates a target condition for a control object, and on a process variable PV that is a measured value for the state of the control object; and
an actuator controlling step for changing a gain of the actuator so as to have an effect wherein a change of the process variable PV that is produced through a change in the gain of the actuator tracks a change in the set point SP;
wherein the actuator controlling step includes a step for changing the gain of the actuator in accordance with time that has elapsed since the point in time of the change of the set point SP, after changing the gain of the actuator in accordance with a change in the set point SP, so as to return to the value of the gain from prior to the change.

10. The controlling method as set forth in claim 9, wherein:
the feedback controlling system is a control loop for controlling a room temperature through flow rate control of a thermal medium; and
the actuator controlling step includes a step for changing the gain of the actuator through controlling the temperature of the thermal medium in accordance with a change in the set point SP that indicates the target value for the room temperature.

11. The controlling method as set forth in claim 10, wherein:
the feedback controlling system is a control loop for controlling a room temperature through flow rate control of supply air, which is a thermal medium;
the actuator is a VAV unit for adjusting the flow rate of the supply air; and
the actuator controlling step includes a step for changing the gain of the actuator through controlling the temperature of the supply air in accordance with a change in the set point SP that indicates the target value for the room temperature.

12. The controlling method as set forth in claim 9, wherein:
the actuator controlling step includes a step for changing the gain of the actuator through ramping in accordance with a ramped change in the set point SP.

13. The controlling method as set forth in claim 9, wherein:
the actuator controlling step includes a step for changing the gain of the actuator through stepping in accordance with a stepped change in the set point SP.

14. The controlling method as set forth in claim 9, wherein:
the actuator controlling step includes a step for changing the gain of the actuator in accordance with a magnitude of change or rate of change in the set point SP.

15. A controlling method, comprising:
a set point obtaining step for obtaining a set point SP from a feedback control system that calculates, and outputs to an actuator, a manipulated variable MV based on the set point SP, which indicates a target condition for a control object, and on a process variable PV that is a measured value for the state of the control object; and
an actuator controlling step for changing a gain of the actuator so as to have an effect wherein a change of the process variable PV that is produced through a change in the gain of the actuator tracks a change in the set point SP;
wherein the actuator controlling step includes a step for changing the gain of the actuator a certain amount of time prior to the change in the set point SP when the control pattern of the set point SP is applied in advance, depending on a signal that provides notification in advance of a change in the set point SP.

16. The controlling method as set forth in claim 15, wherein:
the actuator controlling step includes a step for causing the gain of the actuator to remain constant in the vicinity of a transition point of the set point SP from rising to falling or from falling to rising.

* * * * *